United States Patent
Nakazawa et al.

(10) Patent No.: US 9,862,517 B2
(45) Date of Patent: Jan. 9, 2018

(54) BLOW MOLDED CONTAINER, FUEL CONTAINER, AND METHOD FOR PRODUCING BLOW MOLDED CONTAINER

(71) Applicant: KURARAY CO., LTD., Kurashiki-shi (JP)

(72) Inventors: Shogo Nakazawa, Kurashiki (JP); Hiroshi Kawai, Kurashiki (JP); Nahoto Hayashi, Kurashiki (JP); Tatsuya Oshita, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 678 days.

(21) Appl. No.: 14/384,564

(22) PCT Filed: Mar. 27, 2013

(86) PCT No.: PCT/JP2013/059152
§ 371 (c)(1),
(2) Date: Sep. 11, 2014

(87) PCT Pub. No.: WO2013/146962
PCT Pub. Date: Oct. 3, 2013

(65) Prior Publication Data
US 2015/0041462 A1  Feb. 12, 2015

(30) Foreign Application Priority Data
Mar. 28, 2012 (JP) .................. 2012-075228

(51) Int. Cl.
*B29D 22/00* (2006.01)
*B29C 45/00* (2006.01)
(Continued)

(52) U.S. Cl.
CPC ........ *B65D 1/0215* (2013.01); *B29C 49/0005* (2013.01); *B29C 49/22* (2013.01);
(Continued)

(58) Field of Classification Search
CPC ..... B29C 49/22; B29C 49/0005; B32B 27/08; B32B 27/306; B32B 27/32;
(Continued)

(56) References Cited

U.S. PATENT DOCUMENTS 3,997,703 A * 12/1976 Nakashio ................ B32B 27/00
156/328
6,288,165 B1  9/2001 Moritani et al.
(Continued)

FOREIGN PATENT DOCUMENTS

| CN | 1066859 A | 12/1992 |
|---|---|---|
| CN | 1281004 A | 1/2001 |

(Continued)

OTHER PUBLICATIONS

International Preliminary Report on Patentability dated Oct. 1, 2014 in PCT/JP2013/059151 filed Mar. 27, 2013.
(Continued)

*Primary Examiner* — William Cheung
(74) *Attorney, Agent, or Firm* — Oblon, McClelland, Maier & Neustadt, L.L.P.

(57) ABSTRACT

A blow molded container including (A) a layer containing an ethylene-vinyl alcohol copolymer as a principal component, in which the layer (A) contains an unsaturated aldehyde, and the content of the unsaturated aldehyde in the layer (A) is 0.01 ppm or more and 100 ppm or less. The unsaturated aldehyde (II) is preferably an unsaturated aliphatic aldehyde. The unsaturated aldehyde (II) is preferably at least one selected from the group consisting of crotonaldehyde, 2,4-hexadienal and 2,4,6-octatrienal. The layer (A) preferably contains a conjugated polyene compound, and the content of the conjugated polyene compound in the layer (A) is preferably 0.01 ppm or more and 1,000 ppm or less.

12 Claims, 1 Drawing Sheet

(51) Int. Cl.
*B65D 6/00* (2006.01)
*B65D 1/40* (2006.01)
*B65D 1/02* (2006.01)
*B29C 49/22* (2006.01)
*B32B 27/08* (2006.01)
*B32B 27/30* (2006.01)
*B29C 49/00* (2006.01)
*B32B 27/18* (2006.01)
*B32B 27/32* (2006.01)
*C08K 5/07* (2006.01)
*C08K 5/09* (2006.01)
*B29K 23/00* (2006.01)
*B29K 105/00* (2006.01)
*B29L 9/00* (2006.01)
*B29L 31/00* (2006.01)

(52) U.S. Cl.
CPC ............ *B32B 27/08* (2013.01); *B32B 27/18* (2013.01); *B32B 27/306* (2013.01); *B32B 27/32* (2013.01); *B65D 1/40* (2013.01); *C08K 5/07* (2013.01); *C08K 5/09* (2013.01); *B29K 2023/086* (2013.01); *B29K 2105/258* (2013.01); *B29K 2995/0067* (2013.01); *B29L 2009/00* (2013.01); *B29L 2031/7158* (2013.01); *B32B 2270/00* (2013.01); *B32B 2307/412* (2013.01); *B32B 2307/558* (2013.01); *B32B 2307/7265* (2013.01); *B32B 2439/40* (2013.01); *B32B 2439/60* (2013.01); *Y10T 428/1397* (2015.01)

(58) Field of Classification Search
CPC ............ B32B 2439/60; B32B 2439/40; B32B 2307/558; B32B 2307/7265; B32B 2307/412; B32B 2207/00; B65D 1/0215; B65D 1/40; C08K 5/07; C08K 5/09; C08L 29/04; B29L 2031/7158; B29L 2009/00; B29K 2105/258; B29K 2023/086; Y10T 428/1397
USPC ............ 220/4.13, 62.22; 264/512; 428/36.92
See application file for complete search history.

(56) References Cited

U.S. PATENT DOCUMENTS

| | | | |
|---|---|---|---|
| 7,534,829 B2 | 5/2009 | Tai et al. | |
| 2002/0164442 A1* | 11/2002 | Hirota | B29C 49/08 428/35.7 |
| 2002/0176953 A1 | 11/2002 | Tsai et al. | |
| 2003/0031817 A1 | 2/2003 | Hayashi et al. | |
| 2004/0204549 A1 | 10/2004 | Yoshimi et al. | |
| 2008/0003390 A1 | 1/2008 | Hayashi et al. | |

FOREIGN PATENT DOCUMENTS

| | | | |
|---|---|---|---|
| CN | 1636032 A | | 7/2005 |
| CN | 101006130 A | | 7/2007 |
| JP | 4-227744 | | 8/1992 |
| JP | 4-363304 | | 12/1992 |
| JP | 5 255554 | | 10/1993 |
| JP | 9-71620 | | 3/1997 |
| JP | 11-60874 | | 3/1999 |
| JP | 11 140136 | | 5/1999 |
| JP | 2001-72823 | | 3/2001 |
| JP | 2001 206999 | | 7/2001 |
| JP | 2001 234008 | | 8/2001 |
| JP | 2002-60403 | | 2/2002 |
| JP | 2004 35759 | | 2/2004 |
| JP | 2004 526835 | | 9/2004 |
| JP | 2007 31725 | | 2/2007 |
| JP | 2007-031725 | * | 2/2007 |
| JP | 2009-242645 | | 10/2009 |
| WO | 2005 014716 | | 2/2005 |
| WO | 2005 105437 | | 11/2005 |

OTHER PUBLICATIONS

Written Opinion dated Apr. 23, 2013 in PCT/JP2013/059151 filed Mar. 27, 2013 (English translation only).
U.S. Appl. No. 14/407,595, filed Dec. 12, 2014, Nakazawa, et al.
U.S. Appl. No. 14/407,136, filed Dec. 11, 2014, Nakazawa, et al.
U.S. Appl. No. 14/842,955, filed Sep. 2, 2015, Nakazawa, et al.
Extended European Search Report dated Sep. 28, 2015 in Patent Application No. 13767946.0.
International Search Report dated Jul. 2, 2013 in PCT/JP13/059152 Filed Mar. 27, 2013.

* cited by examiner

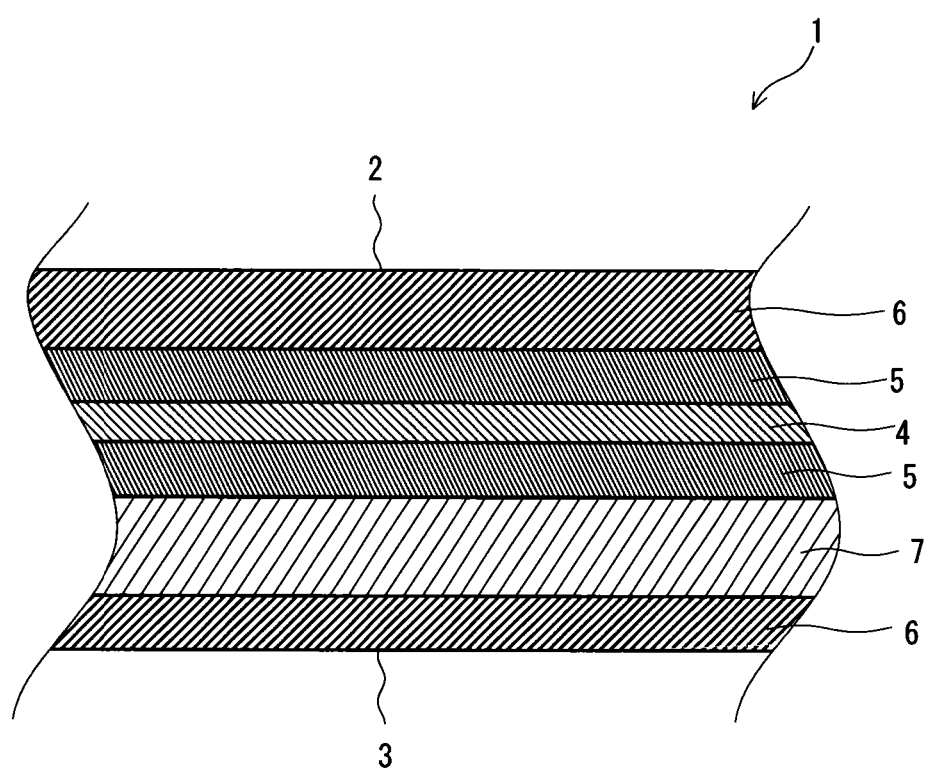

BLOW MOLDED CONTAINER, FUEL CONTAINER, AND METHOD FOR PRODUCING BLOW MOLDED CONTAINER

This application is a National Stage application under 35 USC 371 of PCT International Application No. PCT/JP13/59152, filed on Mar. 27, 2013, which claims priority to Japan Patent application no. 2012-075228 filed Mar. 28, 2012, all of which are herein incorporated by reference in their entirety.

TECHNICAL FIELD

The present invention relates to a blow molded container and a fuel container, and a method for producing a blow molded container.

BACKGROUND ART

Ethylene-vinyl alcohol copolymers (hereinafter, may be abbreviated as EVOH(s)) are polymeric materials that are superior in barrier properties against gas such as oxygen, oil resistance, antistatic properties, and the like. Therefore, EVOH-containing resin compositions have been widely used as various types of packaging materials, etc., through molding into containers, films, sheets and the like. Particularly, in the field of blow molded containers and the like, multilayer structures have been widely employed which are formed from a layer constituted with the EVOH-containing resin composition, a layer constituted with other thermoplastic resin that is superior in moisture resistance, impact resistance, etc., and the like.

For the blow molded containers, melt molding is generally conducted; however, the melt molding may result in impaired appearance characteristics of molded articles through generation of defects such as gels, seeds (dirt under paint), streaks and the like. In addition, the gels, seeds and the like not only lead to impairment of the appearance of the molded article but also cause deterioration of performance; therefore, suppression of these events is needed.

Furthermore, in the step of manufacturing blow molded containers, an operation of the melt molding apparatus must be stopped once and restarted after a certain time period for a change of the resin, a halt in manufacture on weekends, etc., as well as a replacement operation of the molding die, and the like. In these instances, a small amount of the resin composition remaining in the apparatus may be deteriorated during the steps of elevation and lowering of the temperature of the apparatus, and gelled upon restarting, leading to the occurrence of a disadvantage of causing deterioration of appearance characteristics and qualities such as strength of the molded articles. Therefore, after the restarting of the apparatus, it is necessary to conduct idling for a certain time period to await until such gels and the like disappear and the appearance of the molded articles is reverted to the normal state. In light of the production cost, the time period required for the reverting is preferably short, in other words, a self-purge feature is preferably favorable; however it is impossible to conclude that the self-purge feature of conventional EVOH-containing resin compositions is favorable.

Therefore, as EVOH-containing resin compositions having an improved self-purge feature, (1) a resin composition prepared by adding a polyolefin resin, a carboxylic acid-modified polyolefin resin and an alkaline earth metal salt of a lower fatty acid having 9 or less carbon atoms to an EVOH resin at a specific ratio (Japanese Unexamined Patent Application, Publication No. H5-255554), and (2) an EVOH-containing resin composition containing a carboxylic acid having a specific viscosity and a molecular weight of less than 75, and an alkaline earth metal salt at a specific ratio (Japanese Unexamined Patent Application, Publication No. 2001-234008) have been known. However, due to containing the alkaline earth metal, these EVOH-containing resin compositions may cause coloring of molded articles, and also the self-purge feature is not satisfactory. Particularly, the aforementioned EVOH-containing resin composition (1) is disadvantageous in leading to deterioration of the hue and impairment of the long-run workability, owing to the addition of the polyolefin resin.

In addition, a production method of EVOH has been known in which crotonaldehyde is coexisted in a polymerization step of ethylene and vinyl acetate (Japanese Unexamined Patent Application, Publication No. 2007-31725). According to this production method, an adhesion of scales in the interior of a polymerization tank can be suppressed by the coexistence of crotonaldehyde during polymerization. As a result, in regard to films of EVOH produced by this production method, generation of fish eyes resulting from the scales detached and contaminated in the polymer can be reportedly decreased.

However, in the production method, crotonaldehyde added in the polymerization is consumed in the polymerization step and a saponification step, and further washed away with water in a washing step and the like; therefore, crotonaldehyde hardly remains in a finally obtained resin composition containing EVOH since the solubility of crotonaldehyde in water is 18.1 g/100 g at 20° C. (see THE MERCK INDEX 14th 2006). Therefore, effects of the unsaturated aldehyde such as crotonaldehyde on an improvement of thermal stability and/or long-run workability in a secondary processing (melt molding, etc.) of the resultant EVOH has been unknown.

PRIOR ART DOCUMENTS

Patent Documents

Patent Document 1: Japanese Unexamined Patent Application, Publication No. H5-255554
Patent Document 2: Japanese Unexamined Patent Application, Publication No. 2001-234008
Patent Document 3: Japanese Unexamined Patent Application, Publication No. 2007-31725

SUMMARY OF THE INVENTION

Problems to be Solved by the Invention

The present invention was made in view of the foregoing circumstances, and an object of the invention is to provide a blow molded container that is superior in appearance characteristics through suppression of coloring, and generation of defects such as gels, seeds, streaks and the like resulting from melt molding. In addition, another object of the present invention is to provide a blow molded container enabling production at a low cost with a favorable self-purge feature in production, and being capable of achieving qualities such as sufficient strength.

Means for Solving the Problems

According to an aspect of the invention made for solving the aforementioned problems, a blow molded container includes (A) a layer containing (I) an ethylene-vinyl alcohol copolymer as a principal component (hereinafter, may be also referred to as "layer (A)" or "(A) layer"), in which the layer (A) contains (II) an unsaturated aldehyde, and
the content of the unsaturated aldehyde (II) in the layer (A) is 0.01 ppm or more and 100 ppm or less.

According to the blow molded container of the aspect of the present invention, due to including the layer (A) having the content of the unsaturated aldehyde (II) falling within the above-specified range, generation of defects such as gels, seeds and streaks resulting from melt molding can be inhibited, leading to superior appearance characteristics. Moreover, due to containing the above-specified amount of the unsaturated aldehyde (II), the layer (A) can reduce the production cost of the blow molded container since a superior self-purge feature can be attained in the step of producing the blow molded container.

It is to be noted that the principal component as referred to herein means a component in an amount over half of the entirety, and the entirety may be constituted from the principal component alone.

The unsaturated aldehyde (II) is preferably (II-1) an unsaturated aliphatic aldehyde, and more preferably at least one selected from the group consisting of crotonaldehyde, 2,4-hexadienal and 2,4,6-octatrienal.

The action of the unsaturated aldehyde (II) in suppressing the generation of the fish eyes, gels and streaks in melt molding is not necessarily clear. However, since the unsaturated aldehyde (II) is more likely to be oxidized as compared with EVOH (I), oxidative degradation of EVOH (I) by oxygen during the heat melting is supposed to be suppressed owing to the unsaturated aldehyde (II) more rapidly oxidized than EVOH (I).

It is preferred that the layer (A) further contains a conjugated polyene compound, and the content of the conjugated polyene compound in the layer (A) is 0.01 ppm or more and 1,000 ppm or less.

When the layer (A) further contains the above-specified amount of the conjugated polyene compound in this manner, suppression of oxidative degradation in melt molding further inhibits the generation of defects such as gels and seeds, and the occurrence of coloring and the like, leading to a further improvement of the appearance characteristics. Moreover, when the layer (A) contains the above-specified amount of the conjugated polyene compound, more superior self-purge feature is attained, and the production cost of the blow molded container can be further decreased.

It is preferred that the conjugated polyene compound is sorbic acid and/or a sorbic acid salt. When the layer (A) contains sorbic acid and/or the sorbic acid salt as the conjugated polyene compound, oxidative degradation in melt molding can be more effectively suppressed. Accordingly, properties of inhibiting coloring and generation of defects such as gels and seeds, as well as appearance characteristics can be effectively improved. In addition, when the layer (A) contains sorbic acid and/or the sorbic acid salt as a conjugated polyene compound, generation of gels, seeds and the like is suppressed even if melt molding is continuously carried out for a long period of time, and a blow molded container that is superior in impact resistance can be obtained.

The blow molded container preferably includes:
(B) a layer which is provided on the inner face side and the external face side of the layer (A), and contains as a principal component a thermoplastic resin having a solubility parameter calculated using a Fedors equation of 11 or less (hereinafter, may be also referred to as "(B) layer" or "layer (B)"); and (C) a layer which is provided between the layer (A) and the layer (B), and contains as a principal component a carboxylic acid-modified polyolefin (hereinafter, may be also referred to as "(C) layer" or "layer (C)").

The blow molded container can have improved gas barrier properties at a high humidity, oil resistance, impact resistance and the like due to further including in addition to the layer (A), the layer (B) and the layer (C).

The blow molded container preferably includes
(D) a layer containing (I) an ethylene-vinyl alcohol copolymer, a thermoplastic resin having a solubility parameter calculated using a Fedors equation of 11 or less, and a carboxylic acid-modified polyolefin (hereinafter, may be also referred to as "(D) layer" or "layer (D)").

When the blow molded container further has the layer (D), gas barrier properties at a high humidity, impact resistance and the like can be further improved.

It is preferred that the layer (D) is formed using a recovered matter of the layer (A), the layer (B) and the layer (C) in the production step of the blow molded container. When the layer (D) is formed using the recovered matter of the layer (A), the layer (B) and the layer (C) in the production step of the blow molded container, weld flash generated in the production step of the blow molded container, unacceptable articles on an inspection and the like are recycled for the layer (D) layer. Accordingly, the material resin can be used without waste, and thus achievability of low-cost is improved.

In the blow molded container, it is preferred that the layer thickness of the layer (A) accounts for 5.0% or less of the total thickness of all the layers, and the content of the ethylene-vinyl alcohol copolymer in the layer (D) is 9.0% by mass or less. In the blow molded container, when the layer thickness of the layer (A) accounts for 5.0% or less of the total thickness of all the layers, and the content of the ethylene-vinyl alcohol copolymer in the layer (D) is 9.0% by mass or less, the impact resistance can be further improved while superior gas barrier properties, oil resistance, appearance characteristics, self-purge feature and the like are maintained.

The blow molded container is suitably used for a fuel container. Since the blow molded container is superior in gas barrier properties, oil resistance and the like as well as in appearance characteristics, the blow molded container can be suitably used for a fuel container.

In addition, the blow molded container is suitably used for a blow molded bottle. The blow molded container is superior in gas barrier properties, oil resistance and the like, as well as in appearance characteristics.

Furthermore, a preferred method for producing the blow molded container according to the aspect of the present invention includes the step of:

blow molding using a resin composition containing (I) an ethylene-vinyl alcohol copolymer as a principal component, in which the resin composition contains (II) an unsaturated aldehyde, and the content of the unsaturated aldehyde (II) in the resin composition is 0.01 ppm or more and 100 ppm or less.

According to the method for producing a blow molded container, generation of defects such as gels, seeds and streaks and coloring is suppressed, and thus a blow molded container that is superior in the appearance can be obtained. In addition, since the resin composition used in the method for producing a blow molded container is superior in a self-purge feature, reduction of the production cost is enabled.

Effects of the Invention

The blow molded container according to the aspect of the present invention has sufficient gas barrier properties and oil resistance which are characteristic of EVOH, and additionally generation of defects such as gels, seeds and streaks resulting from melt molding and coloring are suppressed due to containing the above-specified amount of the unsaturated aldehyde (II) in the layer (A), leading to superior appearance characteristics. Moreover, according to the blow molded container, since the layer (A) contains the above-specified amount of the unsaturated aldehyde (II), a self-purge feature in the production step is also superior, whereby the production cost of the blow molded container can be reduced. Therefore, the blow molded container can be used in various applications, and is particularly suited for fuel containers and blow molded bottle containers.

BRIEF DESCRIPTION OF THE DRAWINGS

The FIGURE shows a schematic partially cross sectional view illustrating one embodiment of the blow molded container of the present invention.

DESCRIPTION OF EMBODIMENTS

Hereinafter, preferred embodiments for carrying out the present invention will be explained with reference to drawings, but the present invention is not limited thereto. Moreover, unless stated particularly, materials illustrated may be used either alone, or two or more types thereof may be used in combination.

Blow Molded Container

The blow molded container 1 shown in FIG. 1 includes:

(A) a layer 4 containing (I) an ethylene-vinyl alcohol copolymer as a principal component;

(B) a layer 6 which is provided on the inner face side and the external face side of the layer (A), and contains as a principal component a thermoplastic resin having a solubility parameter calculated using a Fedors equation of 11 or less;

(C) a layer 5 which is provided between the layer (A) and the layer (B), and contains as a principal component a carboxylic acid-modified polyolefin; and (D) a layer 7 containing (I) an ethylene-vinyl alcohol copolymer, a thermoplastic resin having a solubility parameter calculated using a Fedors equation of 11 or less, and a carboxylic acid-modified polyolefin.

More specifically, the blow molded container 1 has a multilayer structure including (B) layer 6, (C) layer 5, (A) layer 4, (C) layer 5, (D) layer 7 and (B) layer 6 laminated in this order from the inner surface 2 of the container toward the outer surface 3 of the container. It is to be noted that FIG. 1 shows a partially cross sectional view of a surrounding wall of the blow molded container 1. Each layer will be explained below.

(A) Layer

The (A) layer 4 is a layer containing EVOH (I) as a principal component, and contains 0.01 ppm or more and 100 ppm or less of the unsaturated aldehyde (II). When the blow molded container 1 has the (A) layer 4 containing the above-specified amount of the unsaturated aldehyde (II), generation of defects such as gels, seeds and streaks resulting from melt molding can be suppressed, leading to superior appearance characteristics. Also, due to the (A) layer 4 containing the specific amount of the unsaturated aldehyde (II), a self-purge feature in the production step of the blow molded container 1 is also superior, and therefore, production cost can be reduced. Moreover, it is preferred that the (A) layer 4 further contains a conjugated polyene compound. Additionally, the (A) layer 4 may contain a boron compound, acetic acid and/or an acetic acid salt, a phosphorus compound, and/or other optional component(s) within a range not leading to impairment of the effects of the present invention. Hereinafter, each component is explained in detail.

EVOH (I)

EVOH (I) used in the embodiment of the present invention is an ethylene-vinyl alcohol copolymer obtained by saponifying an ethylene-vinyl ester copolymer.

The EVOH (I) has an ethylene content of typically 20 mol % or more and 60 mol % or less, preferably 20 mol % or more and 45 mol % or less, more preferably 24 mol % or more and 45 mol % or less, still more preferably 27 mol % or more and 42 mol % or less, and even more preferably 27 mol % or more and 38 mol % or less. When the ethylene content is less than 20 mol %, gelation of EVOH becomes likely to occur due to decreased thermal stability in melt extrusion, and thus defects such as gels, seeds and streaks are likely to occur. In particular, when the operation is carried out for a long time period under conditions involving a higher temperature or higher speed than that in conditions for general melt extrusion, gelation of EVOH becomes remarkable. Moreover, when EVOH has an ethylene content of greater than 60 mol %, gas barrier properties may be impaired.

The degree of saponification of a vinyl ester component of the EVOH (I) is typically 85% or more, preferably 90% or more, more preferably 98% or more, and still more preferably 99% or more. When the degree of saponification of the vinyl ester component of the EVOH (I) in the resin composition is less than 85%, thermal stability may be insufficient.

A typical vinyl ester used for producing the EVOH (I) is exemplified by vinyl acetate; however, in addition thereto, other fatty acid vinyl ester such as vinyl propionate and vinyl pivalate may be used.

In addition to the ethylene and the vinyl ester, a vinylsilane compound may be further used as a copolymer component for the EVOH (I). The content of the vinylsilane compound in the EVOH is 0.0002 to 0.2 mol %.

Examples of the vinylsilane compound include vinyltrimethoxysilane, vinyltriethoxysilane, vinyltri(β-methoxyethoxy)silane, γ-methacryloxypropylmethoxysilane, and the like. Of these, vinyltrimethoxysilane and vinyltriethoxysilane are preferred.

For the EVOH (I), other monomer(s) except for ethylene, vinyl esters and vinylsilane compounds may be used as a copolymer component, within a range not leading to impairment of the effects of the present invention.

Examples of the other monomer include:

unsaturated hydrocarbons such as propylene and butylene;

unsaturated carboxylic acids or esters thereof such as (meth)acrylic acid, methyl (meth)acrylate and ethyl (meth)acrylate;

vinylpyrrolidones such as N-vinylpyrrolidone, and the like.

The content of the EVOH (I) in the (A) layer 4 is typically 95% by mass or more, preferably 98.0% by mass or more, more preferably 99.0% by mass or more, and still more preferably 99.5% by mass or more. When the (A) layer 4 having a content of the EVOH (I) falling within the above-specified range is provided, the blow molded articles obtained from the resin composition have superior barrier properties against various types of gases, oil resistance, and the like.

Unsaturated Aldehyde (II)

The (A) layer 4 contains in addition to the EVOH (I), 0.01 ppm or more and 100 ppm or less of the unsaturated aldehyde (II) as an essential component.

The unsaturated aldehyde (II) is an aldehyde having a carbon-carbon double bond or triple bond in its molecule, and is preferably an unsaturated aliphatic aldehyde (II-1) and more preferably at least one selected from the group consisting of crotonaldehyde, 2,4-hexadienal and 2,4,6-octatrienal.

The content of the unsaturated aldehyde (II) in the (A) layer 4 is 0.01 ppm or more and 100 ppm or less, preferably 0.05 ppm or more and 50 ppm or less, more preferably 0.1 ppm or more and 30 ppm or less, and still more preferably 0.15 ppm or more and 20 ppm or less. When the content of the unsaturated aldehyde (II) in the (A) layer 4 of the blow molded container 1 is less than 0.01 ppm, the self-purge feature in production may be insufficient. Whereas, when the content of the unsaturated aldehyde (II) in the (A) layer 4 is greater than 100 ppm, the unsaturated aldehyde (II) exhibits a crosslinking effect in melt molding, coloring and generation of defects such as gels, seeds and streaks may be caused; therefore, the appearance characteristics may be insufficient. The content of the unsaturated aldehyde (II) in the (A) layer 4 as referred to herein is represented by a proportion with respect to the total mass of the solid content of the resin composition containing as a principal component the EVOH (I) that constitutes the (A) layer 4 (hereinafter, may be also referred to as "EVOH-containing resin compositions"), and specifically, is a value obtained by a quantitative determination of the unsaturated aldehyde (II) contained in a dry resin composition dried.

The unsaturated aldehyde (II) is preferably (II-1) an unsaturated aliphatic aldehyde, more preferably an aldehyde having a carbon-carbon double bond in its molecule such as acrylaldehyde (acrolein), crotonaldehyde, methacrylaldehyde, 2-methyl-2-butenal, 2-hexenal, 2,6-nonadienal, 2,4-hexadienal, 2,4,6-octatrienal, 2-hexenal and 5-methyl-2-hexenal, as well as an aldehyde having a carbon-carbon triple bond such as propiolaldehyde, 2-butyn-1-al and 2-pentyn-1-al, still more preferably a linear or branched unsaturated aliphatic aldehyde having a carbon-carbon double bond, and even more preferably at least one selected from the group consisting of crotonaldehyde, 2,4-hexadienal and 2,4,6-octatrienal. In particular, crotonaldehyde having a boiling point of about 100° C. and having a high solubility in water is further preferred because of ease in eliminating an excess, or adding a shortage as needed in a washing step and/or a drying step, for example. Further, the unsaturated aldehyde (II) has preferably 3 to 10 carbon atoms, more preferably 4 to 8 carbon atoms, and still more preferably 4, 6 or 8 carbon atoms, including aldehyde moieties.

Conjugated Polyene Compound

It is preferred that the (A) layer 4 further contains a conjugated polyene compound, and the content of the conjugated polyene compound is preferably 0.01 ppm or more and 1,000 ppm or less, and more preferably 0.1 ppm or more and 1,000 ppm or less. When the blow molded container 1 has the (A) layer 4 further containing the above-specified amount of the conjugated polyene compound, oxidative degradation in melt molding can be suppressed, and thus the coloring and the generation of defects such as gels and seeds are less likely to occur, leading to more superior appearance characteristics. In addition, when the (A) layer 4 contains the above-specified amount of the conjugated polyene compound, generation of gels, seeds and the like can be suppressed even in the case in which melt molding is continuously carried out for a long period of time, and thus a blow molded container that is superior in impact resistance can be obtained.

The conjugated polyene compound as referred to means a compound having a conjugated double bond, as generally referred to, i.e., a compound: having a structure formed by alternately linking a carbon-carbon double bond and a carbon-carbon single bond; and having two or more carbon-carbon double bonds. The conjugated polyene compound may be a conjugated diene having two double bonds, a conjugated triene having three double bonds, or a conjugated polyene having more than three conjugated double bonds. In addition, the conjugated double bond may be present in a multiple number in a single molecule without being conjugated one another. For example, compounds having three conjugated triene structures in the same molecule, such as tung oil, may be also included in the conjugated polyene compound.

The conjugated polyene compound preferably has 7 or less conjugated double bonds. When the (A) layer 4 contains a conjugated polyene compound having 8 or more conjugated double bonds, coloring of the blow molded container 1 formed therefrom is likely to occur.

The conjugated polyene compound may have in addition to the conjugated double bond, other functional group such as a carboxyl group and a salt thereof, a hydroxyl group, an ester group, a carbonyl group, an ether group, an amino group, an imino group, an amide group, a cyano group, a diazo group, a nitro group, a sulfone group and a salt thereof, a sulfonyl group, a sulfoxide group, a sulfide group, a thiol group, a phosphoric acid group and a salt thereof, a phenyl group, a halogen atom, a double bond, and a triple bond.

Examples of the conjugated polyene compound include:

conjugated diene compounds such as isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, ocimene, phellandrene, myrcene, farnesene, cembrene, sorbic acid, sorbic acid esters, sorbic acid salts and abietic acid;

conjugated triene compounds such as 1,3,5-hexatriene, 2,4,6-octatriene-1-carboxylic acid, eleostearic acid, tung oil, cholecalciferol, fulvene and tropone;

conjugated polyene compounds such as cyclooctatetraene, 2,4,6,8-decatetraene-1-carboxylic acid, retinol and retinoic acid; and the like. The aforementioned conjugated polyene compound may be used alone, or two or more types thereof may be used in combination. The conjugated polyene compound has preferably 4 to 30 carbon atoms, and more preferably 4 to 10 carbon atoms.

Among these, sorbic acid, a sorbic acid ester, a sorbic acid salt, myrcene and an arbitrary mixture of these are preferred, and sorbic acid, a sorbic acid salt and a mixture of these are more preferred. Sorbic acid, a sorbic acid salt and a mixture of these exhibit superior suppressive effects on oxidative degradation at high temperatures, and are preferred also in light of hygienic properties and availability since they are industrially used broadly also as food additives.

The molecular weight of the conjugated polyene compound is typically 1,000 or less, preferably 500 or less, and more preferably 300 or less. When the molecular weight of the conjugated polyene compound is greater than 1,000, the state of dispersion in EVOH (I) may be inferior, and thus the appearance after the melt molding may be unfavorable.

The content of the conjugated polyene compound in the (A) layer 4 is preferably 0.01 ppm or more and 1,000 ppm or less, more preferably 0.1 ppm or more and 1,000 ppm or less, still more preferably 0.5 ppm or more and 800 ppm or less, and even more preferably 1 ppm or more and 500 ppm or less. In the blow molded container 1, when the content of the conjugated polyene compound in the (A) layer 4 is less than 0.1 ppm, gels and seeds may be generated since the effect of suppressing oxidative degradation in melt molding cannot be sufficiently achieved. On the other hand, when the content of the conjugated polyene compound in the (A) layer 4 is greater than 1,000 ppm, generation of gels and seeds is accelerated; therefore, poor appearance of the blow molded container 1 is likely to be found.

Boron Compound

It is preferred that the (A) layer 4 further contains a boron compound. When the blow molded container 1 has the (A) layer 4 further containing the boron compound, gelation is less likely to occur in melt molding, and a torque fluctuation of an extrusion molding machine and the like can be effectively suppressed, leading to more superior appearance characteristics. Also, as a consequence of containing the boron compound in the (A) layer 4, a more superior self-purge feature in production is also attained, and thus the production at a lower cost is enabled.

Examples of the boron compound include:

boric acids such as orthoboric acid, metaboric acid and tetraboric acid;

boric acid esters such as triethylborate and trimethylborate; boric acid salts such as alkali metal salts or alkaline earth metal salts of the aforementioned boric acids, and borax;

boron hydrides, and the like. Of these, boric acids are preferred, and orthoboric acid (hereinafter, may be also merely referred to as "boric acid") is more preferred.

The content of the boron compound in the (A) layer 4 is preferably 100 ppm or more and 5,000 ppm or less, more preferably 100 ppm or more and 3,000 ppm or less, and still more preferably 1,000 ppm or more and 1,500 ppm or less. In the blow molded container 1, when the content of the boron compound in the (A) layer 4 falls within the above-specified range, a torque fluctuation of an extrusion molding machine and the like in heat melting in the production step can be effectively suppressed. Also, when the content of the boron compound is less than 100 ppm, the effects cannot be sufficiently exhibited, whereas when the content is greater than 5,000 ppm, appearance characteristics of the blow molded container 1 formed from the (A) layer 4 may be insufficient since gelation is likely to occur.

Acetic Acid and/or Acetic Acid Salt

The (A) layer 4 preferably contains acetic acid and/or an acetic acid salt. When the blow molded container 1 has the (A) layer 4 further containing acetic acid and/or an acetic acid salt, coloring can be inhibited, leading to superior appearance characteristics.

With respect to the acetic acid and/or an acetic acid salt, use of both acetic acid and the acetic acid salt is preferred, and use of acetic acid and sodium acetate is more preferred.

The content of acetic acid and/or the acetic acid salt in the (A) layer 4 is preferably 50 ppm or more and 1,000 ppm or less, more preferably 100 ppm or more and 1,000 ppm or less, still more preferably 150 ppm or more and 500 ppm or less, and particularly preferably 200 ppm or more and 400 ppm or less. When the content of acetic acid and/or the acetic acid salt is less than 50 ppm, a sufficient preventive effect on coloring cannot be achieved; therefore, appearance characteristics of the blow molded container 1 may be insufficient due to yellowing and the like. Whereas, when the content of acetic acid and/or the acetic acid salt in the resin composition is greater than 1,000 ppm, gelation is likely to occur in melt molding, particularly in melt molding over a long time period, and thus the appearance of the blow molded container 1 may be unfavorable.

Phosphorus Compound

The (A) layer 4 preferably contains a phosphorus compound. When the blow molded container 1 has the (A) layer 4 further having the phosphorus compound, generation of defects such as gels and seeds and coloring can be further suppressed, and thus the appearance characteristics can be further improved.

Examples of the phosphorus compound include various types of phosphoric acids such as phosphoric acid and phosphorous acid, phosphate, and the like.

The phosphate may be in any form of a monobasic phosphate salt, a dibasic phosphate salt and a tribasic phosphate salt. In addition, the cationic species contained in the phosphate is not particularly limited, and an alkali metal salt, and an alkaline earth metal salt are preferred. Of these, sodium dihydrogen phosphate, potassium dihydrogen phosphate, disodium hydrogen phosphate and dipotassium hydrogen phosphate are more preferred, and sodium dihydrogen phosphate and dipotassium hydrogen phosphate are even more preferred.

The content of the phosphorus compound in the (A) layer 4 is preferably 1 ppm or more and 200 ppm or less, more preferably 2 ppm or more and 200 ppm or less, still more preferably 3 ppm or more and 150 ppm or less, and particularly preferably 5 ppm or more and 100 ppm or less. When the content of the phosphorus compound in the (A) layer 4 of the blow molded container 1 is less than 1 ppm, or is greater than 200 ppm, thermal stability is deteriorated in the production step, and thus coloring as well as generation of gels and seeds become likely to occur, which may lead to insufficient appearance characteristics.

Other Optional Components

The (A) layer 4 may contain an alkali metal as other optional component, within a range not leading to impairment of the effects of the present invention. Examples of the alkali metal include lithium, sodium, potassium and the like. Moreover, the alkali metal may be contained in the form of an alkali metal salt. Examples of the alkali metal salt include aliphatic carboxylic acid salts, aromatic carboxylic acid salts and metal complexes of a monovalent metal, and the like. Specific examples of the alkali metal salt include sodium acetate, potassium acetate, sodium stearate, potassium stearate, sodium salts of ethylenediaminetetraacetate, and the like. Of these, sodium acetate and potassium acetate are preferred. The content of the alkali metal in the (A) layer 4 is preferably 20 ppm or more and 1,000 ppm or less, and more preferably 50 ppm or more and 500 ppm or less.

The (A) layer 4 may contain an antioxidant, an UV absorbent, a plasticizer, an antistatic agent, a lubricant, a colorant, a filler, a heat stabilizer, another resin, a metal salt of a higher aliphatic carboxylic acid, a hydrotalcite compound and the like as other optional components, as well as the aforementioned alkali metal. The (A) layer 4 may contain one, or two or more types of these optional components, and the content of the optional component(s) is 1% by mass or less in total.

Examples of the antioxidant include 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl 3-(3',5'-di-t-butyl-4'-hydroxyphenyl)propionate, 4,4'-thiobis-(6-t-butylphenol), and the like.

Examples of the UV absorbent include ethylene 2-cyano-3,3'-diphenylacrylate, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone.

Examples of the plasticizer include dimethyl phthalate, diethyl phthalate, dioctyl phthalate, waxes, liquid paraffins, phosphoric acid esters, and the like.

Examples of the antistatic agent include pentaerythritol monostearate, sorbitan monopalmitate, sulfated polyolefins, polyethylene oxides, Carbowax, and the like.

Examples of the lubricant include ethylene bisstearamide, butyl stearate, and the like.

Examples of the colorant include carbon black, phthalocyanine, quinacridone, indoline, azo pigment, colcothar, and the like.

Examples of the filler include glass fibers, wollastonite, calcium silicate, talc, montmorillonite, and the like.

Examples of the heat stabilizer include hindered phenol compounds, hindered amine compounds, and the like.

Examples of the other resin include polyamides, polyolefins, and the like.

Examples of the metal salt of a higher aliphatic carboxylic acid include calcium stearate, magnesium stearate, and the like.

In order to prevent generation of gels, one, or two or more types of the hydrotalcite compound, the hindered phenol heat stabilizer, the hindered amine heat stabilizer and the metal salt of a higher aliphatic carboxylic acid may be added in an amount of 0.01 to 1% by mass.

Preparation Method of EVOH-Containing Resin Composition

The (A) layer 4 can be formed from the EVOH-containing resin composition that contains each component. The preparation method of the EVOH-containing resin composition according to the embodiment of the present invention is not particularly limited as long as the unsaturated aldehyde (II) can be homogenously blended in EVOH, and the unsaturated aldehyde (II) in an amount falling within the range of 0.01 ppm or more and 100 ppm or less can be contained in the (A) layer 4 finally obtained.

However, the preparation method according to the embodiment of the present invention is preferably a production method of a resin composition containing the ethylene-vinyl alcohol copolymer including the steps of:

(1) copolymerizing ethylene with a vinyl ester; and
(2) saponifying a copolymer obtained in the step (1), in which 0.01 ppm or more and 100 ppm or less of the unsaturated aldehyde (II) is contained in the resin composition.

The procedure for allowing the above-specified amount of the unsaturated aldehyde (II) to be contained in the EVOH-containing resin composition is not particularly limited, but the procedure may be exemplified by:

adding the specified amount of the unsaturated aldehyde (II) in the step (1);
adding the specified amount of the unsaturated aldehyde (II) in the step (2);
adding the specified amount of the unsaturated aldehyde (II) to the EVOH obtained in the step (2), and the like.

However, when the procedure of adding the specified amount of the unsaturated aldehyde (II) in the step (1), or the procedure of adding the specified amount of the unsaturated aldehyde (II) in the step (2) is employed, in order to allow a desired amount of the unsaturated aldehyde (II) to be contained in the resulting resin composition, it is necessary to increase the amount of addition taking into consideration the amount consumed by a polymerization reaction in the step (1) and/or by a saponification reaction in the step (2). In addition, since the amount consumed by the polymerization reaction and/or the saponification reaction may vary depending on the reaction conditions, it would be difficult to regulate the content of the unsaturated aldehyde (II) in the resin composition. Therefore, the procedure of adding, after the step (2), the specified amount of the unsaturated aldehyde (II) to the EVOH obtained in the step (2) is preferred.

The procedure for adding the specified amount of the unsaturated aldehyde (II) to the EVOH may be exemplified by:

pelletizing after blending the unsaturated aldehyde (II) with EVOH beforehand to give pellets;
impregnating a strand obtained by deposition of a paste after saponification of the ethylene-vinyl ester copolymer with the unsaturated aldehyde (II);
impregnating the strand obtained by deposition after cutting, with the unsaturated aldehyde (II);
adding the unsaturated aldehyde (II) to a solution of redissolved chips of a dry resin composition;
melt kneading a blend of two components of the EVOH and the unsaturated aldehyde (II);
feeding the unsaturated aldehyde (II) to be contained in a melt of the EVOH during extrusion;
producing a masterbatch by blending a high concentration of the unsaturated aldehyde (II) with a part of the EVOH and pelletizing the blend, and dry blending the masterbatch with the EVOH and the melt kneading the mixture; or the like.

Of these, in light of a possibility of homogenously dispersing a slight amount of the unsaturated aldehyde (II) in the EVOH, pelletizing after blending the unsaturated aldehyde (II) with EVOH beforehand to give pellets is preferred for the procedure of mixing the unsaturated aldehyde (II). Specifically, the unsaturated aldehyde (II) is added to a solution prepared by dissolving the EVOH in a good solvent such as a mixed solvent of water and methanol, and thus resulting mixture solution is extruded into a poor solvent through a nozzle or the like to allow for deposition and/or coagulation, followed by washing and/or drying the same, whereby the pellets including the unsaturated aldehyde (II) homogenously mixed with the EVOH can be obtained.

Alternatively, in a step following the polymerization step, the unsaturated aldehyde (II) may be added concomitantly with the conjugated polyene compound. By adding the unsaturated aldehyde (II) concomitantly with the conjugated polyene compound, an auxiliary function of the conjugated polyene compound is exhibited, and production of a substance that is resistant to heat melting is inhibited. As a result, a layer having a superior appearance can be obtained.

The procedure for allowing each component other than the unsaturated aldehyde (II) to be contained in the (A) layer 4 may be exemplified by:

mixing the pellets with each component, followed by melt kneading;

mixing each component together with the unsaturated aldehyde (II) in preparing the pellets;

immersing the pellets in a solution containing each component; and the like. Note that a ribbon blender, a high speed mixer, a cokneader, a mixing roll, an extruder, an intensive mixer and the like may be employed for the mixing.

(B) Layer

The (B) layer 6, is a layer which is provided on the inner face side and the external face side of the (A) layer 4, and contains as a principal component a thermoplastic resin having a solubility parameter calculated using a Fedors equation of 11 or less.

The "solubility parameter" calculated using a Fedors equation as referred to herein means a value represented by a formula: $(E/V)^{1/2}$. In the above formula, E is a molecular aggregation energy (cal/mol), and is represented by an equation of $E=\Sigma ei$, wherein ei is an evaporation energy. Further, V is a molecular volume (cm$^3$/mol), and is represented by an equation of $V=\Sigma vi$, wherein vi is a molar volume. The thermoplastic resin having a solubility parameter calculated according to this equation of 11 or less is superior in moisture resistance.

The thermoplastic resin contained in the (B) layer 6 is not particularly limited as long as the thermoplastic resin has the solubility parameter of 11 or less, and examples of the thermoplastic resin include polyethylenes having the solubility parameter of 11 or less (linear low density polyethylenes, low density polyethylenes, medium density polyethylenes, high density polyethylenes, etc.), ethylene-vinyl acetate copolymers, ethylene-propylene copolymers, polypropylenes, copolymers of propylene with an α-olefin having 4 to 20 carbon atoms, homopolymers or copolymers of an olefin such as polybutenes and polypentenes, polystyrenes, polyvinyl chlorides, polyvinylidene chlorides, acrylic resins, vinyl ester resins, polyurethane elastomers, polycarbonates, chlorinated polyethylenes, chlorinated polypropylenes, and the like. Of these, polyethylenes, ethylene-propylene copolymers, ethylene-vinyl acetate copolymers, polypropylenes and polystyrenes are preferred, and high density polyethylenes are more preferred.

In light of rigidity, impact resistance, moldability, drawdown resistance, gasoline resistance and the like, the density of the high density polyethylene is preferably 0.93 g/cm$^3$ or more, more preferably 0.95 g/cm$^3$ or more and 0.98 g/cm$^3$ or less, and still more preferably 0.96 g/cm$^3$ or more and 0.98 g/cm$^3$ or less. Moreover, the melt flow rate (MFR) of the high density polyethylene falls within the range of preferably 0.01 to 0.5 g/10 min (under a load of 2,160 g at 190° C.), and more preferably 0.01 to 0.1 g/10 min.

It is to be noted that the high density polyethylene used may be appropriately selected from among commercially available products, in general. In addition, the (B) layer 6 may contain other optional component(s) similar to the component(s) which may be contained in the (A) layer 4, within a range not leading to impairment of the effects of the present invention.

(C) Layer

The (C) layer 5 is a layer which is provided between the (A) layer 4 and the (B) layer 6, and contains as a principal component a carboxylic acid-modified polyolefin. The (C) layer 5 can function as an adhesion layer between the (A) layer 4 and the other layer such as the (B) layer 6. The term "carboxylic acid-modified polyolefin" as referred to means an olefin-derived polymer having a carboxyl group or an anhydride group thereof, obtained through an addition reaction, a grafting reaction or the like of an ethylenic unsaturated carboxylic acid or an anhydride thereof with an olefin-derived polymer, thereby permitting a chemical binding.

Examples of the ethylenic unsaturated carboxylic acid and the anhydride thereof include monocarboxylic acids, monocarboxylate esters, dicarboxylic acids, dicarboxylic acid mono esters, dicarboxylic acid diesters, dicarboxylic acid anhydrides and the like, and specific examples thereof include maleic acid, fumaric acid, itaconic acid, maleic anhydride, itaconic anhydride, maleic acid monomethyl ester, maleic acid monoethyl ester, maleic acid diethyl ester, fumaric acid monomethyl ester and the like. Of these, dicarboxylic acid anhydrides such as maleic anhydride and itaconic anhydride are preferred, and maleic anhydride is more preferred.

Examples of the olefin-derived polymer include:

polyolefins such as low density, medium density or high density polyethylenes, linear low density polyethylenes, polypropylenes and polybutenes;

copolymers of an olefin with a comonomer which is copolymerizable with the olefin such as a vinyl ester or an unsaturated carboxylate ester, such as e.g., ethylene-vinyl acetate copolymers and ethylene-ethyl acrylate copolymers, and the like. Of these, linear low density polyethylenes, ethylene-vinyl acetate copolymers having a vinyl acetate content of 5 to 55% by mass, and ethylene-ethyl acrylate copolymers having an ethyl acrylate content of 8 to 35% by mass are preferred, and linear low density polyethylenes and ethylene-vinyl acetate copolymers having a vinyl acetate content of 5 to 55% by mass are more preferred.

The carboxylic acid-modified polyolefin is obtained by introducing the ethylenic unsaturated carboxylic acid or the anhydride thereof into the olefin-derived polymer in the presence of, for example, a solvent such as xylene, and a catalyst such as a peroxide through an addition reaction or a grafting reaction. In this procedure, the amount of addition or grafting of the carboxylic acid or the anhydride thereof to the olefin-derived polymer (i.e., degree of modification) is preferably 0.01 to 15% by mass, and more preferably 0.02 to 10% by mass with respect to the olefin-derived polymer.

The carboxylic acid-modified polyolefin may be used either alone of one type, or as a mixture of two or more thereof.

The (C) layer 5 may contain in addition to the carboxylic acid-modified polyolefin, other optional component(s) similar to those which may be contained in the (A) layer 4 within a range not leading to impairment of the effects of the present invention.

(D) Layer

The layer (D) 7 is a layer containing an ethylene-vinyl alcohol copolymer, a thermoplastic resin having a solubility parameter calculated using a Fedors equation of 11 or less, and a carboxylic acid-modified polyolefin. Moreover, the layer (D) 7 is preferably formed using a recovered matter of the (A) layer 4, (B) layer 6 and (C) layer 5 in the production step of the blow molded container 1. In particular, since generation of weld flash is inevitable in the production step of the blow molded container 1, when the blow molded container 1 has such (D) layer 7 as a recovery layer, recycling of the weld flash, and rejected article on an inspection enables the loss of the resin for use in the production of the blow molded container 1 to be reduced.

Although the (D) layer 7 can be used in place of the (B) layer 6, use of the (B) layer 6 and the (D) layer 7 through laminating is preferred since the mechanical strength of the (D) layer 7 is often less than that of the (B) layer 6 in general. In the case in which an external impact is applied to the blow molded container 1, the stress to the container converges, and the compression stress upon the application of the impact acts on the container inner layer side in the convergence area of the stress, leading to a possibility of an occurrence of a breakage. Therefore, the recovery layer that is superior in the strength is preferably provided on the outer layer side with respect to the (A) layer 4 in consideration of the possibilty of the occurrence of the breakage. In addition, for example, in the case in which the weld flash is frequently generated, the recovery layer may be provided as the (D) layer 7 on both the upper and lower sides of the (A) layer 4 when it is necessary to recycle a large amount of the resin.

The content of the EVOH in the (D) layer 7 is preferably 9.0% by mass or less. When the content of the EVOH in the layer (D) 7 is greater than 9% by mass, generation of a crack may be facilitated at the boundary between the (D) layer 7 and the (B) layer 6, and thus a destruction of the entirety of the blow molded container 1 may occur starting from the crack.

Layer Structure of Blow Molded Container 1

When the total of the thickness of each layer present on the inner side of the (A) layer 4 is designated as "I", and the total of the thickness of each layer present on the external side of the (A) layer 4 is designated as "O", the thickness ratio (I/O) is preferably 1/99 to 70/30, more preferably 1/99 to 55/45, and still more preferably 30/70 to 55/45. It is to be noted that the thickness of all layers or each layer of the blow molded container 1 is determined by an optical microscopic inspection on a sample cut away from the body part of the container using a microtome at a plurality of positions to exhibit the cross section, and calculating the average value of all layers or each layer to give an average total thickness or an average thickness of each layer.

Although the average thickness of the (A) layer 4 is not particularly limited, in light of barrier properties, mechanical strength and the like, the average thickness is preferably 5.0% or less, more preferably 0.5% to 5%, still more preferably 1.0% to 4.5%, and particularly preferably 1.5% to 4.0% of the average total thickness of all the layers.

Although the average thickness of the (C) layer 5 is not particularly limited, the average thickness accounts for preferably 0.3% to 12%, more preferably 0.6% to 9%, and still more preferably 1.2% to 6% of the average total thickness. Too small thickness of the (C) layer 5 as the adhesive resin layer is not preferred since the adhesiveness is too low, whereas too great thickness of the (C) layer 5 is not preferred due to an increase of the cost.

The average total thickness of the blow molded container 1 is preferably 300 to 10,000 μm, more preferably 500 to 8,500 μm, and still more preferably 1,000 to 7,000 μm. It is to be noted that the average total thickness as referred to means an average thickness of the body part of the blow molded container 1. When the average total thickness is too great, the weight increases to adversely affect fuel efficiency when used for a fuel container of, for example, automobile and the like, and the cost for the container also increases. On the other hand, when the average total thickness is too small, it would be impossible to maintain the rigidity, and thus the container may be easily broken. Therefore, it is important to predetermine the thickness to meet the volume and use of the container.

Method for Producing Blow Molded Container 1

The blow molded container 1 is preferably produced by a production method including the step of blow molding using a resin composition containing an ethylene-vinyl alcohol copolymer as a principal component, in which the resin composition contains an unsaturated aldehyde (II), and the content of the unsaturated aldehyde (II) in the resin composition is 0.01 ppm or more and 100 ppm or less. The content of the unsaturated aldehyde (II) in the resin composition is preferably 0.01 ppm or more and 100 ppm or less, more preferably 0.1 ppm or more and 30 ppm or less, and still more preferably 0.15 ppm or more and 20 ppm or less. Specifically, blow molding is carried out in a blow molding machine at a temperature of 100° C. to 400° C. from, for example, a parison of 6 layers involving 4 types, i.e., B/C/A/C/D/B, from the inside to the outside, using dry EVOH-containing resin composition pellets for forming the (A) layer 4, the high density polyethylene resin, etc., for forming the layer (B) 5, the adhesive resin for forming the layer (C) 6, and a recovered resin, etc., for forming the (D) layer 7, and then cooling at an internal temperature of the die of 10° C. to 30° C. for 10 sec to 30 min, thereby enabling molding of a hollow container having an average total thickness of 300 μm to 10,000 μm to be perfected. The hollow container can be used, for example, for a fuel tank, a blow molded bottle container, and the like.

Other Embodiments

The blow molded container according to the embodiment of the present invention is not limited to the mode shown in FIG. 1, and is acceptable as long as at least the layer (A) is provided. Specifically, the layer (D) as a recovery layer, and the like may not be provided. Moreover, other layer may be also laminated. In addition, by selecting a combination of resins that provide favorable adhesiveness, the layer (C) as the adhesion layer may be omitted.

In the layer structure of the blow molded container, the layer (B) is preferably provided as the outermost layer. In other words, providing the layer (B)/layer (C)/layer (A)/layer (C)/layer (B) from the container inner surface toward the container outer surface (hereinafter, represented by, e.g., B/C/A/C/B from the inside to the outside) is preferred in light of the impact resistance. Furthermore, when the layer (D) as the recovery layer, etc., is included, the layers may be provided in the order of, for example, the construction of B/C/A/C/D/B from the inside to the outside, B/D/C/A/C/D/B from the inside to the outside, D/C/A/C/D from the inside to the outside or the like, and a construction in which the layer (D) is provided in place of the layer (B) is also acceptable. Of these, the construction of B/C/A/C/D/B from the inside to the outside as in the above embodiment, as well as the construction of B/D/C/A/C/D/B from the inside to the outside is preferred. It is to be noted that in the case of a construction in which the layers (A) to (D) are used in a plurality of number, respectively, the resin constituting each layer may be a same or different.

Fuel Container

The fuel container according to the embodiment of the present invention is provided with the blow molded container described above, and for example, a filter, a fuel gauge, a baffle plate and the like may be provided as needed. Due to being provided with the blow molded container, the fuel container is also superior in appearance characteristics, gas barrier properties, oil resistance and the like; therefore, it can be suitably used as a fuel container. The term "fuel container" as referred to herein means a fuel container mounted in an automobile, motorcycle, watercraft, aircraft, electric power generator, an industrial or agricultural instrument or the like, or a portable fuel container for supplying the fuel to such a fuel container, as well as a container for storing the fuel. Further, typical examples of the fuel include gasoline, particularly oxygen-containing gasoline prepared by blending gasoline with methanol, ethanol or MTBE, and further heavy oil, light oil, kerosene and the like are also included. Of these, the fuel container is particularly suitably used as a fuel container for oxygen-containing gasoline.

EXAMPLES

Hereinafter, the present invention is specifically explained by way of Examples, but the present invention is not in anyhow limited to these Examples. It is to be noted that each quantitative determination in these Examples was carried out using the following method.

Ethylene Content and Degree of Saponification of EVOH

A $^1$H-NMR spectrometer (manufactured by JEOL, Ltd., "model JNM-GX-500") was employed for the determination using DMSO-$d_6$ as a solvent.

Quantitative Determination of Unsaturated Aldehyde (II)

A DNPH (2,4-dinitrophenylhydrazine) preparation was prepared by adding 50 mL of 1,1,1,3,3,3-hexafluoroisopropanol (HFIP), 11.5 mL of acetic acid and 8 mL of ion exchanged water to 200 mg of a 50% by mass DNPH solution. Thereafter, dry EVOH-containing resin composition pellets in an amount of 1 g were added to 20 mL of the DNPH preparation, and dissolved with stirring at 35° C. for 1 hour. To this solution was added acetonitrile to permit precipitation of the EVOH (I), and the resulting solution was filtered and concentrated to obtain an extracted sample. This extracted sample was analyzed for a quantitative determination on high performance liquid chromatography. Thus, the amount of the unsaturated aldehyde (II) was quantitatively determined. Note that upon the quantitative determination, a calibration curve produced using an authentic sample obtained by allowing each unsaturated aldehyde (II) to react with the DNPH preparation was used. Note that as the content of each component in each layer in the blow molded container herein, the content of each component in the dry resin composition used for forming the layer was employed.

Quantitative Determination of Conjugated Polyene Compound

The dry EVOH-containing resin composition pellets were ground by freeze grinding, and 10 g of a ground matter obtained by eliminating coarse particles using a sieve having a nominal dimension of 0.150 mm (100 mesh, in accordance with JIS Z8801-1 to 3) was packed into a Soxhlet extraction apparatus to execute an extraction treatment using 100 mL of chloroform for 48 hrs. The extracted sample was analyzed for a quantitative determination on high performance liquid chromatography. Thus, the amount of the conjugated polyene compound was quantitatively determined. It is to be noted that upon the quantitative determination, a calibration curve produced using an authentic sample of each conjugated polyene compound was used.

Appearance of Solution (Transparency, Coloring Property)

The dry resin composition pellets were subjected to a heat treatment in the air at 120° C. for 15 hrs, and 10 g of the resultant pellets were weighed into a 300 ml Erlenmeyer flask. Thereto was added 100 ml of a mixed solution of water and propanol (mass ratio: water/propanol=45/55), and the mixture was stirred at 75° C. for 3 hrs. Then, transparency and coloring of the solution were evaluated by a visual inspection.

Motor Torque Fluctuation

The dry resin composition pellets in an amount of 60 g were kneaded in a Laboplast Mill (manufactured by Toyo Seiki Seisaku-sho, Ltd., "20R200", twin-screw, counter rotating type) at 100 rpm and 260° C., and a time period was determined which was required until the torque value reached 1.5 times the torque value after 5 min from the beginning of the kneading.

Synthesis of EVOH (I)

Synthesis Example 1

Using a 250 L pressure reaction chamber, polymerization for an ethylene-vinyl acetate copolymer was carried out under the following conditions.
vinyl acetate: 83.0 kg,
methanol: 26.6 kg,
2,2'-azobisisobutylnitrile: 1,119.5 mL/hour,
polymerization temperature: 60° C.
pressure of ethylene in polymerization chamber: 4.93 MPa
polymerization time period: 5.0 hrs The rate of polymerization of vinyl acetate in the resultant copolymer was about 40%. After sorbic acid was added to this copolymerization reaction liquid, the liquid was supplied to a purge tower, and after unreacted vinyl acetate was eliminated from the top of the tower by introducing methanol vapor from the bottom of the tower, a 41% methanol solution of the ethylene-vinyl acetate copolymer was obtained. This ethylene-vinyl acetate copolymer had an ethylene content of 32 mol %. This methanol solution of the ethylene-vinyl acetate copolymer was charged into a saponification reactor, and a solution of sodium hydroxide in methanol (80 g/L) was added so as to attain 0.4 equivalents with respect to the vinyl ester component in the copolymer. Thereto was added methanol to adjust the copolymer concentration of 20%. The temperature of this solution was elevated to 60° C., and the reaction was allowed while blowing nitrogen gas into the reactor for about 4 hrs. This solution was then extruded from a die plate provided with a circular opening into water to permit deposition, followed by cutting to give pellets having a diameter of about 3 mm and a length of about 5 mm. The pellets thus obtained were subjected to deliquoring using a centrifugal separator, and further an operation of the deliquoring after adding a large amount of water was repeated.

Preparation of EVOH-Containing Resin Composition

Twenty kg of the pellets subjected to deliquoring were placed into 180 kg of a mixed solvent of water and methanol (mass ratio: water/methanol=40/60), and the mixture was stirred at 60° C. for 6 hrs to completely dissolve the pellets. To the solution thus obtained were added the unsaturated aldehyde (II) and the conjugated polyene compound, and the mixture was further stirred for 1 hour such that the unsaturated aldehyde (II) and the conjugated polyene compound were completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. thereby permitting coagulation so as to give a strand form. This strand was introduced into a pelletizing machine to obtain porous resin composition chips. The resultant porous resin composition chips were washed with an aqueous acetic acid solution and ion exchanged water. The resin composition chips were separated from the lavage, followed by deliquoring, and thereafter were dried in a hot-air dryer at 80° C. for 4 hrs and further at 100° C. for 16 hrs to obtain a resin composition (dry resin composition pellets). The content of each component in the obtained resin composition was quantitatively determined in accordance with the aforementioned quantitative determination methods to derive the content in the layer (A). The resin composition was prepared such that the contents of the unsaturated aldehyde (II) and the conjugated polyene compound were as shown in Table 1 by adjusting the amount of the unsaturated aldehyde (II) added, and the concentration of each component in the aqueous solution for the immersion treatment.

Synthesis Example 2 and Preparation of EVOH-Containing Resin Composition

Pellets were obtained in a similar manner to Synthesis Example 1 except that sorbic acid and crotonaldehyde were concomitantly added after completion of the polymerization. Twenty kg of the resulting pellets were placed into 180 kg of a mixed solvent of water and methanol (mass ratio: water/methanol=40/60), and the mixture was stirred at 60° C. for 6 hrs to completely dissolve the pellets. To the solution thus obtained was added sorbic acid as the conjugated polyene compound, and the mixture was further stirred for 1 hour such that sorbic acid is completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. thereby permitting coagulation so as to give a strand form. This strand was introduced into a pelletizing machine to obtain porous resin composition chips. After the resultant porous resin composition chips were washed with an aqueous acetic acid solution and ion exchanged water, an immersion treatment in an aqueous solution containing acetic acid, sodium acetate, potassium dihydrogen phosphate and boric acid was carried out. The resin composition chips were separated from the aqueous solution for the immersion treatment, followed by deliquoring, and thereafter were dried in a hot-air dryer at 80° C. for 4 hrs and further at 100° C. for 16 hrs to obtain a resin composition (dry resin composition pellets). The content of each component in the obtained resin composition was quantitatively determined using the aforementioned quantitative determination methods. It is to be noted that the resin composition was prepared such that the content of each component was as shown in Table 1 by adjusting the concentration of each component in the aqueous solution for the immersion treatment.

Evaluations of EVOH-Containing Resin Composition

Each EVOH-containing resin composition obtained in the above manner was evaluated as in the following. The results of the evaluations are shown together in Table 1.

(1) Evaluation of Appearance of Solution (Transparency and Coloring)

With respect to the solution heated with stirring for 3 hrs, transparency and coloring of the solution were evaluated by a visual inspection in accordance with the following evaluation criteria.

Evaluation Criteria of Transparency
 "favorable (A)": transparent, suspended matter recognizable by the visual inspection being absent.
 "somewhat favorable (B)": somewhat turbid, suspended matter recognizable by the visual inspection being present.
 "unfavorable" (C)": turbid, suspended matter being present.

Evaluation Criteria of Coloring of Solution
 "favorable (A)": colorless
 "somewhat favorable (B)": somewhat colored
 "poor, unfavorable" (C)": significantly colored (4) Evaluation of Motor Torque Fluctuation Alteration of the viscosity when heated was evaluated as follows. It is to be noted that the viscosity of the resin composition when heated is a factor that affects the long-run workability in secondary processing.

Evaluation Criteria of Motor Torque Fluctuation
 "favorable (A)": no less than 60 min
 "somewhat favorable (B)": no less than 40 min and less than 60 min
 "unfavorable" (C)": less than 40 min Preparation of Recovered Resin After dry blending 4 parts by mass of the dry EVOH resin pellet, 86 parts by mass of a high density polyethylene resin (manufactured by Mitsui Petrochemical Industries, Ltd., HZ8200B; MFR: 0.01 g/10 min at 190° C. under a load of 2,160 g), and 10 parts by mass of an adhesive resin (manufactured by Mitsui Chemicals, Inc., ADMER GT-6A (trade name); MFR: 0.94 g/10 min at 190° C. under a load of 2,160 g), the blend was extruded using a twin-screw extruder ("2D25W", manufactured by Toyo Seiki Seisaku-sho, Ltd.; 25 mmφ, die temperature: 220° C., screw rotation speed: 100 rpm), in a nitrogen atmosphere to allow for pelletization. Furthermore, in order to obtain a model recovered resin, the extruded pellets were further extruded using the same extruder under the same condition to execute pelletization, and the same operation was repeated four times (blending in the extruder being repeated five times in total) to obtain a recovered resin.

Production of Blow Molded Container

Examples 1 to 17, and Comparative Examples 1 to 3

Using the dry EVOH resin pellets, the high density polyethylene resin, the adhesive resin and the recovered resin, a parison of 6 layers involving 4 types, i.e., high density polyethylene/adhesive resin/EVOH/adhesive resin/recovered resin/resin composition, from the inside to the outside was extruded for 2 hours in a blow molding machine TB-ST-6P manufactured by Suzuki Seiko Co., Ltd. at 210° C., and the operation was stopped for 2 hrs with the state of heating maintained. Thereafter, the operation was restarted, and blow molded containers produced after each specified time period were evaluated. In the production of the blow molded container, cooling at an internal temperature of the die of 15° C. for 20 sec lead molding of a 500 mL tank having a total thickness of all the layers of 1,000 μm (high density polyethylene/adhesive resin/EVOH/adhesive resin/recovered resin/resin composition from the inside to the outside=340/50/40/50/400/120 μm from the inside to the outside). The tank had a bottom face diameter of 100 mm, and a height of 400 mm. It should be noted that the dry EVOH resin pellets of Examples 1 to 11, 13 to 17, and Comparative Examples 1 to 3 were obtained as in Synthesis Example 1. Whereas, the dry EVOH resin pellets of Example 12 were obtained as in Synthesis Example 2. The dry EVOH resin pellets of Comparative Example 1 were obtained as in Synthesis Example 1, but crotonaldehyde as the unsaturated aldehyde (II) was not added in the preparation of the EVOH-containing resin composition.

Evaluation of Blow Molded Container

Each blow molded container obtained in the above manner was evaluated as in the following. The results of the evaluations are shown together in Table 1.

Evaluation of Appearance Characteristics

With respect to a 500-mL tank molded after 40 min from restarting, evaluations on appearance characteristics were made through evaluating streaks and coloring by a visual inspection in accordance with the following criteria.

Evaluation Criteria of Streaks
"favorable (A)": no streaks found.
"somewhat favorable (B)": streaks found.
"unfavorable" (C)": a large number of streaks found.

Evaluation Criteria of Coloring
"favorable (A)": colorless.
"somewhat favorable (B)": yellowed.
"unfavorable" (C)": significantly yellowed.

Evaluation of Impact Resistance

A 500-mL tank blow molded each after 20 min, 40 min, and 10 hrs from restarting was filled with 400 mL of ethylene glycol, and the opening was capped by heat-sealing using a film having a structure of polyethylene 40 μm/aluminum foil 12 μm/polyethylene terephthalate 12 μm. This tank was cooled at −40° C. for 3 days, and was dropped from a height of 6 meters so as to stand with the opening faced upward, and the evaluation was made in accordance with the number of the pieces broken (n=10). The impact resistance after 20 min from restarting is employed as a marker of the self-purge feature.

Evaluation Criteria of Impact Resistance
"favorable (A)": less than 3.
"somewhat favorable (B)": 3 to less than 6.
"unfavorable (C)": 6 or greater.

TABLE 1

| | Unsaturated aldehyde | | Conjugated polyene compound | | Average thickness of layer (A) (%) | EVOH content in layer (D) (% by mass) | Evaluations Appearance of solution | |
|---|---|---|---|---|---|---|---|---|
| | substance | content (ppm) | type | content (ppm) | | | transparency | coloring |
| Example 1 | crotonaldehyde | 0.08 | sorbic acid | 200 | 4 | 6.7 | A | A |
| Example 2 | crotonaldehyde | 0.3 | sorbic acid | 200 | 4 | 6.7 | A | A |
| Example 3 | crotonaldehyde | 0.3 | sorbic acid | 0.03 | 4 | 6.7 | A | B |
| Example 4 | crotonaldehyde | 0.3 | sorbic acid | 0.2 | 4 | 6.7 | A | B |
| Example 5 | crotonaldehyde | 0.3 | sorbic acid | 950 | 4 | 6.7 | A | B |
| Example 6 | crotonaldehyde | 0.3 | sorbic acid | 2,000 | 4 | 6.7 | A | B |
| Example 7 | crotonaldehyde | 0.3 | potassium sorbate | 200 | 4 | 6.7 | A | A |
| Example 8 | crotonaldehyde | 0.3 | myrcene | 200 | 4 | 6.7 | A | B |
| Example 9 | crotonaldehyde | 2.5 | sorbic acid | 200 | 4 | 6.7 | A | A |
| Example 10 | crotonaldehyde | 18 | sorbic acid | 200 | 4 | 6.7 | A | B |
| Example 11 | crotonaldehyde | 47 | sorbic acid | 200 | 4 | 6.7 | A | B |
| Example 12 | crotonaldehyde | 90 | sorbic acid | 50 | 4 | 6.7 | A | A |
| Example 13 | 2,4-hexadienal | 0.3 | sorbic acid | 200 | 4 | 6.7 | A | B |
| Example 14 | 2,4,6-octatrienal | 0.3 | sorbic acid | 200 | 4 | 6.7 | A | B |
| Example 15 | crotonaldehyde | 35 | sorbic acid | 1,200 | 4 | 6.7 | A | B |
| Example 16 | crotonaldehyde | 0.3 | sorbic acid | 0.01 | 4 | 6.7 | A | B |
| Example 17 | crotonaldehyde | 0.08 | sorbic acid | 200 | 4 | 6.7 | A | B |
| Comparative Example 1 | — | N.D. *1 | sorbic acid | 6,000 | 4 | 6.7 | C | C |
| Comparative Example 2 | crotonaldehyde | N.D. *1 | sorbic acid | 1,000 | 4 | 6.7 | C | C |
| Comparative Example 3 | crotonaldehyde | 500 | sorbic acid | 200 | 4 | 6.7 | C | C |

| | | Evaluations | | | | |
|---|---|---|---|---|---|---|
| | | | Appearance characteristics | | Impact resistance | |
| | Motor torque fluctuation | streak | coloring | after 20 min | after 40 min | after 10 hrs |
| Example 1 | B | A | A | B | A | A |
| Example 2 | A | A | A | A | A | A |

TABLE 1-continued

| | | | | | | |
|---|---|---|---|---|---|---|
| Example 3 | A | B | B | A | A | B |
| Example 4 | B | A | A | A | A | B |
| Example 5 | B | A | A | A | A | A |
| Example 6 | B | B | B | B | B | B |
| Example 7 | A | A | A | A | A | A |
| Example 8 | B | A | A | A | A | B |
| Example 9 | A | A | A | A | A | A |
| Example 10 | A | A | A | A | A | A |
| Example 11 | A | B | B | A | A | A |
| Example 12 | A | A | A | A | A | A |
| Example 13 | B | A | B | A | B | B |
| Example 14 | B | A | B | A | B | B |
| Example 15 | A | B | B | A | B | B |
| Example 16 | B | B | B | A | B | B |
| Example 17 | A | B | B | A | B | B |
| Comparative Example 1 | C | C | C | C | C | C |
| Comparative Example 2 | C | B | B | B | C | C |
| Comparative Example 3 | C | C | C | C | C | C |

*1 N.D.: not detected, with the detection lower limit of 0.01 ppm

As shown in Table 1, it was revealed that the blow molded container according to the embodiment of the present invention was accompanied by suppressed generation of streaks and coloring, leading to superior appearance characteristics as compared with Comparative Examples. In addition, the blow molded container according to the embodiment of the present invention was superior in the impact resistance even if molded after 20 min from restarting the molding apparatus. It was proven that due to use of the EVOH-containing resin composition that is superior in the self-purge feature, generation of gels, seeds and the like that deteriorates the impact resistance is less likely to occur in the blow molded container according to the embodiment of the present invention briefly after restarting.

INDUSTRIAL APPLICABILITY

According to the blow molded container of the embodiment of the present invention, due to having sufficient gas barrier properties and oil resistance characteristic in the EVOH, as well as having the layer (A) containing the specific amount of the unsaturated aldehyde (II), coloring and generation of defects such as gels, seeds and streaks resulting from melt molding can be suppressed, leading to superior appearance characteristics. In addition, since the layer (A) contains the specific amount of the unsaturated aldehyde (II), a superior self-purge feature in the production step of the blow molded container is attained; therefore, the blow molded container can be produced at a low cost. Therefore, the blow molded container can be used in a variety of applications, and is particularly suited for a fuel container.

EXPLANATION OF THE REFERENCE SYMBOLS

1 blow molded container
2 container inner surface
3 container outer surface
4 (A) layer
5 (C) layer
6 (B) layer
7 (D) layer

The invention claimed is:

1. A blow molded container comprising:
   (A) a layer comprising an ethylene-vinyl alcohol copolymer (I) as a principal component,
   the layer (A) comprising an unsaturated aldehyde (II), and
   a content of the unsaturated aldehyde (II) in the layer (A) being 0.01 ppm or more and 100 ppm or less.

2. The blow molded container according to claim 1, wherein the unsaturated aldehyde (II) is an unsaturated aliphatic aldehyde (II-1).

3. The blow molded container according to claim 2, wherein the unsaturated aldehyde (II) is crotonaldehyde, 2,4-hexadienal, 2,4,6-octatrienal or a combination thereof.

4. The blow molded container according to claim wherein the layer (A) comprises a conjugated polyene compound, and a content of the conjugated polyene compound in the layer (A) is 0.01 ppm or more and 1,000 ppm or less.

5. The blow molded container according claim 4, wherein the conjugated polyene compound is sorbic acid, a sorbic acid salt or a combination thereof.

6. The blow molded container according to claim 1, further comprising:
   (B) a layer which is provided on an inner face side and an external face side of the layer (A), and comprises as a principal component a thermoplastic resin having a solubility parameter calculated using a Fedors equation of 11 or less; and
   (C) a layer which is provided between the layer (A) and the layer (B), and comprises as a principal component a carboxylic acid-modified polyolefin.

7. The blow molded container according claim 6, comprising:
   (D) a layer comprising an ethylene-vinyl alcohol copolymer (I), a thermoplastic resin having a solubility parameter calculated using a Fedors equation of 11 or less, and a carboxylic acid-modified polyolefin.

8. The blow molded container according claim 7, wherein the layer (D) is formed using a recovered matter of the layer (A), the layer (B) and the layer (C) in the production step of the blow molded container.

9. The blow molded container according claim 7, wherein the average thickness of the layer (A) accounts for 5.0% or less of an average total thickness, and a content of the ethylene-vinyl alcohol copolymer (I) in the layer (D) is 9.0% by mass or less.

10. A fuel container comprising the blow molded container according to claim 1.

11. A blow molded bottle container comprising the blow molded container according to claim 1.

12. A method for producing the blow molded container according to claim 1, the method comprising:
blow molding using a resin composition comprising an ethylene-vinyl alcohol copolymer (I) as a principal component,
wherein
the resin composition comprises an unsaturated aldehyde (II), and
a content of the unsaturated aldehyde (II) in the resin composition is 0.01 ppm or more and 100 ppm or less.

* * * * *